United States Patent [19]

Gardner et al.

[11] Patent Number: 4,557,303

[45] Date of Patent: Dec. 10, 1985

[54] SPINDLE SHAPER

[75] Inventors: Gary L. Gardner; Chester K. Greathouse, both of McMinnville, Tenn.

[73] Assignee: Powermatic - Houdaille, Inc., McMinnville, Tenn.

[21] Appl. No.: 633,597

[22] Filed: Jul. 23, 1984

[51] Int. Cl.[4] ............................ B27C 5/00; B27C 5/06
[52] U.S. Cl. ............................ 144/145 A; 144/134 A; 409/213; 409/217
[58] Field of Search ........... 144/134 R, 134 A, 145 R, 144/145 A, 136, 137; 409/203, 213, 217

[56] References Cited

U.S. PATENT DOCUMENTS

| | | | |
|---|---|---|---|
| 1,334,335 | 3/1920 | Warren et al. | 29/52 |
| 1,382,380 | 6/1921 | Parsons | 82/25 |
| 1,568,641 | 5/1926 | Thacher | 82/21 R |
| 1,794,885 | 3/1931 | Dodge | 29/54 |
| 2,392,074 | 1/1946 | Wasson | 29/44 |
| 2,659,961 | 11/1953 | Dilts | 29/44 |
| 3,008,501 | 11/1961 | Hammer | 144/286 R |
| 3,255,790 | 6/1966 | Manasek et al. | 144/134 R |
| 3,459,076 | 8/1969 | Kummer | 82/14 |
| 3,546,774 | 12/1970 | Stöferle et al. | 29/568 |
| 4,060,112 | 11/1977 | Leeper, Jr. | 144/134 R |
| 4,243,081 | 1/1981 | Pritelli | 144/3 A |
| 4,450,882 | 5/1984 | Hitchcock et al. | 144/145 A |

OTHER PUBLICATIONS

Sheet entitled "Model 26 Universal Spindle Shaper" by Powermatic Houdaille, Inc.
Sheet entitled "26 PC In-Line Automatic Shaper" by Powermatic.

Primary Examiner—W. D. Bray
Assistant Examiner—Jorji M. Griffin
Attorney, Agent, or Firm—Hill, Van Santen, Steadman & Simpson

[57] ABSTRACT

A spindle shaper machine tool successively performs a plurality of operations on a work piece without removal and replacement of cutter heads on the spindle. The cutter heads are superimposed on the spindle, a fluid pressure jack quickly shifts the spindle to align a selected head with a work piece and the work piece is either manually or automatically advanced across the rotating selected tool. In the automatic shaper tool, a collar bearing stop for each cutter head is also provided on the spindle to abut the work piece or a template controlling the cutting of the work piece. The jack can be manually actuated by the operator or automatically actuated at the completion of a cutting cycle. Various combinations of cutter heads and bearing stop sets are mountable on the spindle to perform selected operations such as rough and finishing cuts, heavy-duty and light cuts, cutting and sanding, adding or modifying cuts and the like.

12 Claims, 8 Drawing Figures

SPINDLE SHAPER

BACKGROUND OF THE INVENTION

This invention relates to spindle shapers adapted to mount a plurality of cutter heads on the spindle and quickly align the work piece and heads to place a selected head in operative position. Specifically, the invention relates to a spindle shaper with a rapidly shiftable spindle carrying a plurality of superimposed removal cutter heads and cooperating collar bearing stops which are quickly shifted into alignment with the work piece to perform successive operations thereon.

THE PRIOR ART

Rotary spindle shaper tools or machines are used to contour shape the edges of wood, laminates, plastics, composites, and various man-made materials. These machines are of the manual type with a set position "fence" to guide the work piece past the spindle mounted cutter head or of the automatic type having a spindle carried cutter head plus a spindle carried collar bearing stop which either rides on the work piece or on a template holding the work piece to control feed of the work to the cutter. Previously known manual or automatic shapers have a spindle which must be manually positioned to align the cutter head with the work piece and to position the collar bearing and cutter head relative to the work piece or template. An example of an automatic spindle cutter requiring manual shifting of the spindle to position a single cutter tool and collar bearing set relative to the work piece is described and claimed in the Lonnie G. Hitchcock and Richard J. Flanigan U.S. Pat. No. 4,450,882, issued May 29, 1984, and assigned to the same assignee as this application.

It would therefore be an improvement in this art to provide manual and automatic spindle shapers which relatively shift a multiple cutter head carrying spindle and work piece to successively place a selected cutter head in operative position.

SUMMARY OF THE INVENTION

According to this invention manual and automatic spindle shapers are provided with spindles or quills carrying a plurality of cutter heads to successively perform combinations of cutting operations on a work piece. The cutter heads are superimposed on the spindle, are easily removed and replaced, and in the automatic machines are mounted in sets including collar bearing stops which ride on the work piece or template to control the feeding of the work piece to the cutter. A quick acting mechanism, such as a pneumatic or hydraulic jack shifts either the spindle or the work piece support table to align the work piece and cutter head for the cutting operation. The jack is actuated either manually or automatically at the end of a cutting operation. The jack operates against preset limits which are adjustable by the machine operator to accommodate the various operating levels required by the particular combination of cutter head sets on the spindle.

The spindle is initially manually adjusted to align the first use cutter head with the work and then after the first cutting cycle is completed, the jack is actuated to shift the spindle for moving the second cutter head into alignment with the work. Upon completion of the second cutting operation, the jack moves the spindle back to its initial position. In some instances more than two cutter heads can be mounted on the spindle whereupon selectively energized stops sequentially step the limits of the jack and are set to place the third and subsequent cutter heads into alignment with the work upon completion of the second cutting operation.

In the automatic spindle shaper machine, each cutter head on the spindle has its cooperating bearing collar stop to ride on the work or a template for controlling the feed to the cutter head.

Many combinations of cutter heads and cooperating collar bearing stops are available to eliminate heretofore required separate shaper machines, extra set-up steps, multiple handling of the work piece and template, and the like. For example, there may be provided sets of cutter head combinations including a roughing cutter and a finishing cutter, identical cutters sized to permit the first cutter to perform the bulk of the work and experience the related high tool wear and a second cutter taking only a light cut and thereby maintaining its cutting edge for longer periods while at the same time producing a superior finish, cutters successively performing different operations, and the like. Less cutter sharpening, fewer cutters, and less machine downtime is accomplished.

Another cutter head combination available on the spindle shapers of this invention includesa sanding head/collar set coupled with a cutter/collar set to successively shape and sand in the same set-up.

It is then an object of this invention to provide spindle shapers with spindles carrying a plurality of stacked cutter heads and mechanism for quickly aligning the work and a selected cutter head in operative position for the cutting operation by either shifting the spindle or the work support.

Another object of this invention is to provide manual and automatic spindle shapers with a multiple cutter head carrying spindle and mechanism for quickly shifting the spindle relative to the work for successively aligning the cutter heads with the work.

A still further object of this invention is to provide shapers with multiple cutter head carrying spindles which are quickly shifted to successively align the cutter heads with the work.

A specific object of this invention is to provide manual and automatic spindle shapers with quick acting fluid pressure operated jacks shifting either the work table or the spindle to successively align a plurality of cutter heads with the work for a plurality of cutting operations.

Other and further objects of this invention will become apparent to those skilled in this art from the following detailed description of the annexed sheets of drawings which, by way of example, show several best mode embodiments of the invention.

ON THE DRAWINGS

AS SHOWN ON THE DRAWINGS

Figure 1:
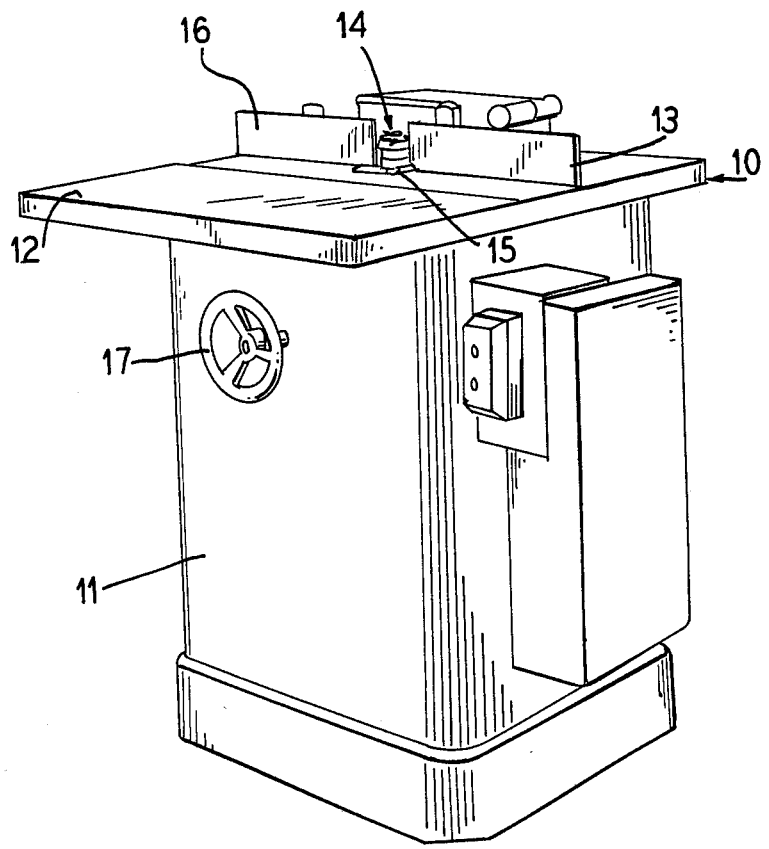
FIG. 1 is a front and side perspective view of a manual spindle shaper of this invention.

The manual spindle shaper 10 of FIG. 1 has an upstanding square or rectangular base 11, a flat horizontal top work table 12, an upstanding horizontally adjustable vertical input fence 13 on the work table against which the work is bottomed as it is advanced to a cutter head 14 on a vertical spindle 15 projecting upwardly from the work table 12 and an output or discharge fence 16 receiving the cut edge of the work piece from the cutter head 14. The spindle 15 is manually raised and lowered to align the cutter head 14 with the work piece on the table 12 by means of a handwheel 17.

Figure 2:
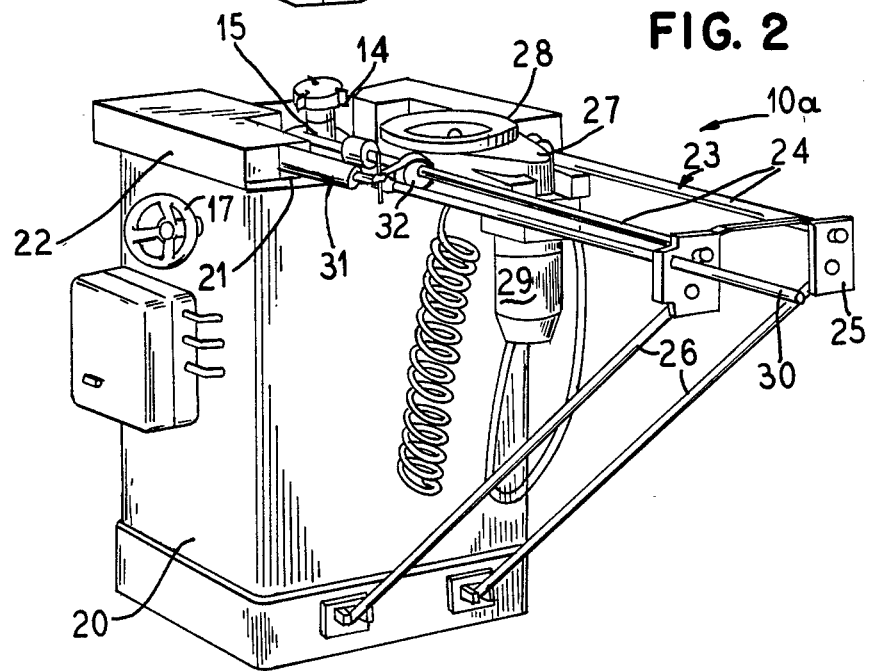
FIG. 2 is a perspective view similar to FIG. 1, but illustrating an automatic shaper of this invention.

The automatic spindle shaper 10a of FIG. 2 has a similar square or rectangular upstanding base 20, with a flat top 21 having a box-like collar 22 surrounding a central open front and open top work zone of the table top 21. The top of the collar 22 is flat and assists in the support of the work piece.

A track or slide support 23 projects laterally from the open front of the table top 21 and has parallel horizontal rods 24 clamped at their inner ends to the table top and secured at their outer ends in a brace 25 which in turn is supported by rods 26 from the bottom of the base or frame 20. A carriage 27 is slidable on the rods 24 and rotatably mounts a feed table or chuck 28 for the work piece. A motor 29 depending from the carriage 27 rotates the table 28.

An elongated piston rod 30 extends alongside one of the track rods 24 and slides through the brace 25. The piston rod 30 is reciprocated by the piston in a pneumatic jack 31. A manually actuated clamp 32 on the carriage 27 selectively secures the carriage to the piston rod 30 so that the carriage may first slide on the rods into starting position and then be clamped to the rod 30 to be pulled by the jack.

The spindle shaper 10a has a vertical spindle projecting from the work table 21 which, for convenience, is marked with the same reference numeral 15 as the spindle of the shaper 10 to carry the same type cutter head 14. The same type handwheel 17 also raises and lowers the spindle 15 of the shaper 10a.

The automatic shaper 10a of FIG. 2 is more fully described and illustrated in the aforesaid U.S. Pat. No. 4,450,882.

Figure 3:
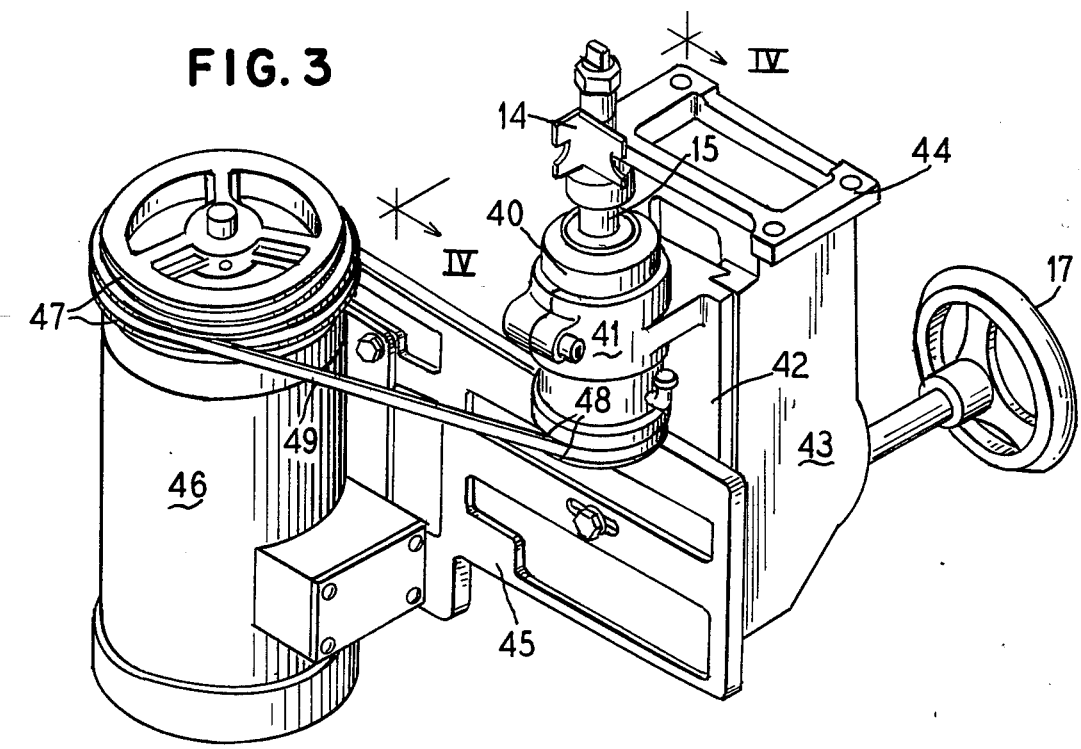
FIG. 3 is a perspective view of the spindle mounting and motor drive of the shapers of FIGS. 1 and 2.

As shown in FIG. 3, the spindle 15 of both the manual and automatic shaper is rotatably mounted in a cylindrical housing 40 which is clamped in a cylindrical bracket 41 projecting laterally from a slide 42 on a vertical face of a housing 43 which has an open top 44 suspended from the work table 12 or 21. This slide 42 also mounts a bracket plate 45 carrying an upstanding electric motor 46 with a driven shaft mounting stacked pulleys 47 of different diameters. The bottom end of the spindle 15 also mounts a stack of pulleys 48 decreasing in diameter from the top to the bottom in opposition to the pulleys 47 which decrease in diameter from bottom to top. A drive belt 49 connects a selected pulley 47 with a selective pulley 48 to drive the spindle at a desired speed. The motor 46 thus can be a constant speed motor while the spindle is driven at different speeds determined by the pulley selection for the belt 49.

Figure 4:
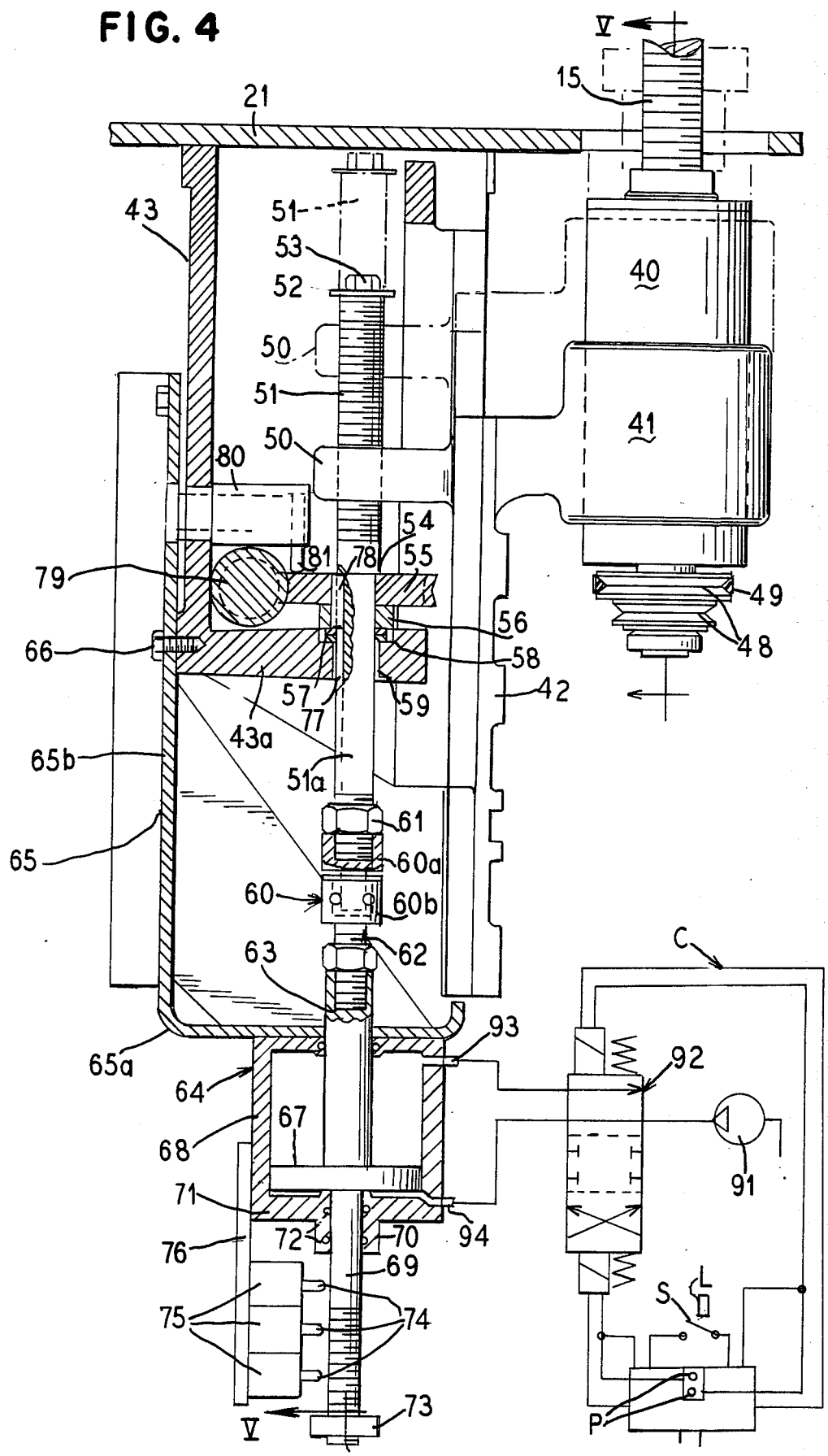
FIG. 4 is a fragmentary vertical sectional view along the line IV—IV of FIG. 3.

As shown in FIG. 4, the slide 42 has an internally threaded boss 50 projecting into the housing 43 and receiving in threaded relation therewith, an externally threaded post or screw rod 51 with a stop collar 52 held on the top end thereof by a nut 53. The screw rod 51 has a bottom shoulder 54 resting on a worm gear 55 with a bottom hub 56 which is supported on roller bearings 57 carried in a recess 58 in the top wall of a bottom portion 43a of the housing 43. A reduced diameter unthreaded portion 51a of the rod 51 extends through the gear 55, hub 56, bearing 57, and bore 59 through the bottom wall 43a to a coupling 60 composed of two relatively rotating parts 60a and 60b, with the bottom end of the rod 51a threaded into the portion 60a to a depth determined by a nut 61. The bottom portion 60b of the coupling 60 has a stem 62 threaded into the piston rod 63 of a pneumatic jack 64 mounted on the bottom 65a of a bracket plate 65 having an upstanding leg 65b bolted at 66 to the side face of the housing 43.

The piston rod 63 has a piston head 67 slidable in the cylinder 68 of the jack 64. A stem 69 extends from the piston head 67 through a nipple 70 on the bottom wall 71 of the jack housing with seals 72 preventing leakage from the interior of the jack housing. This stem 69 has an adjusting nut 73 threaded on the bottom thereof and providing an abutment for the retractable plugs or cores 74 of a plurality of superimposed solenoids 75 which are mounted on a plate 76 depending from the jack housing. The initial position of the piston 67 in the jack housing is determined by adjusting the nut 73 into abutment with the bottom solenoid core 74.

The reduced diameter rod portion 51a of the rod 51 has a key slot 77 along its entire length receiving a key 78 mounted in the gear 55 and its hub 56 thereby coupling the rod 51 for rotation with the gear 55. This gear 55 meshes with a worm 79 rotatably mounted in the housing 43 and extending therebeyond to the handwheel 17. A horizontal plug 80 secured in the sidewall of the housing extends over the worm 79 and gear 55 carrying a threaded stop screw 81 which rides on the gear 55 thereby holding the gear and its hub 56 on the bearing 57 to maintain the gear in fully meshed relation with the worm 79.

When the handwheel 17 rotates the worm 79 to drive the gear 55, the key 78 will also rotate the post or rod 51 which is threaded through the slide carried boss 50 thereby raising the slide 42. Reverse rotation of the handwheel, of course, will lower the slide.

The raising and lowering of the slide 42 adjusts the height of the spindle 15 relative to the work table 12 or 21.

Figure 6:
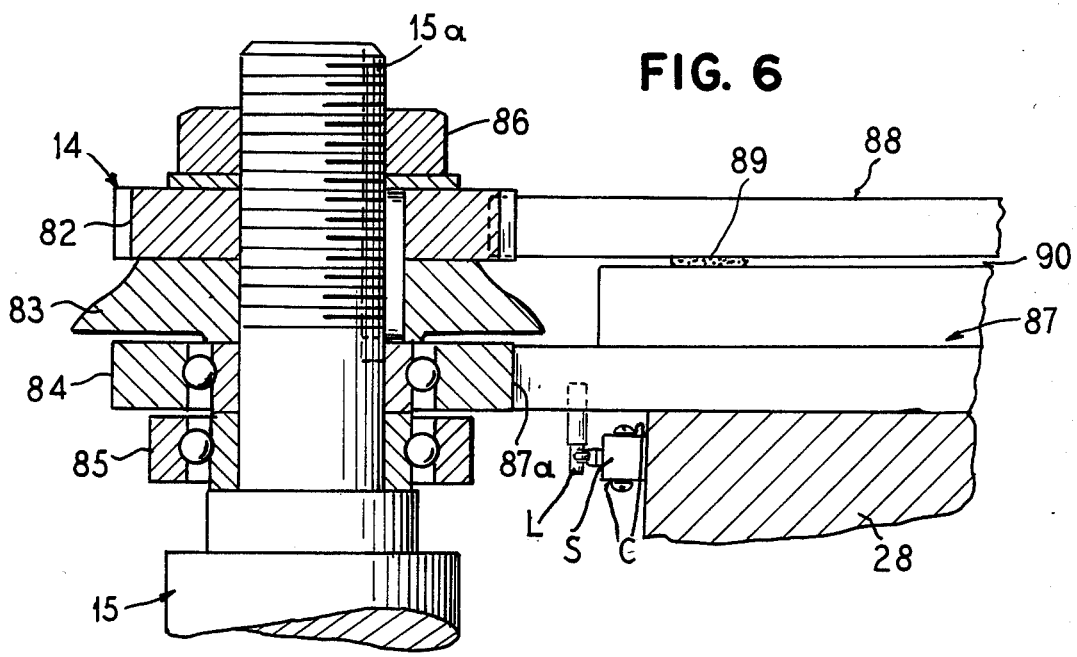
FIG. 6 is a fragmentary elevational view partly in vertical section of the shaper spindle or quill carrying a plurality of cutter heads and collar bearing stops positioned relative to the work to present the template to the rough cut collar stop and the work to the rough cut cutter head.
Figure 7:
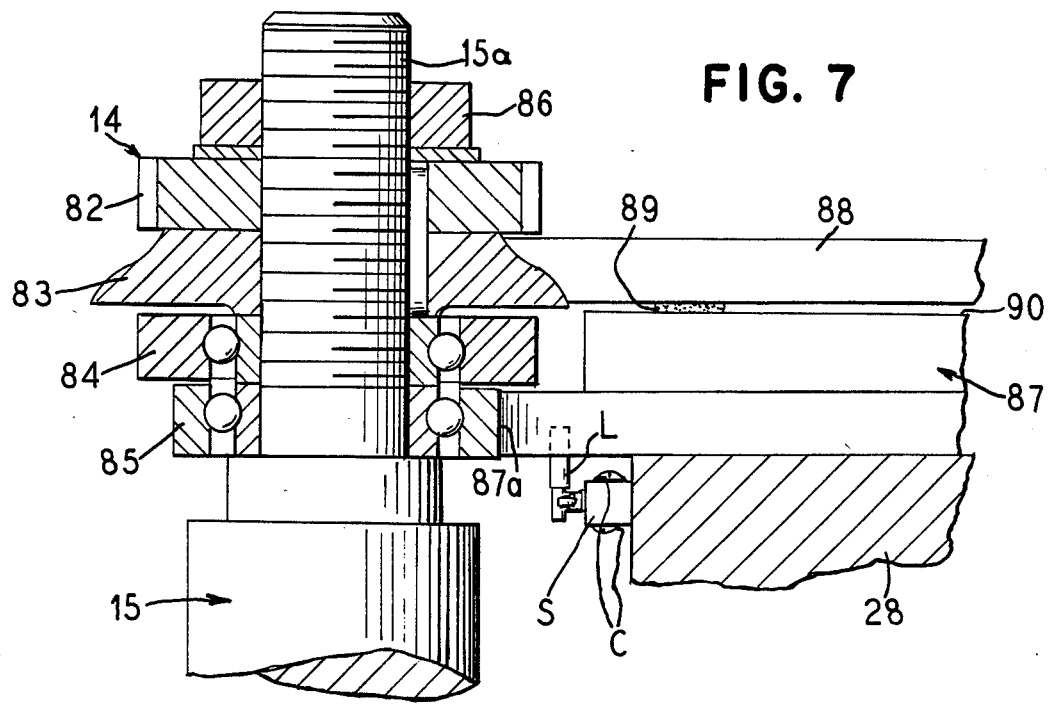
FIG. 7 is a view similar to FIG. 6 illustrating the shifted position of the quill or spindle to present the finish bearing collar stop to the template and the finish cutter head to the work.

As shown in FIGS. 6 and 7, the spindle or quill 15 has an externally threaded top end 15a on which are removably stacked a desired combination of bearing collar stops and cutters designated generally at 14, and in the illustrations, including from top to bottom, a rough cutter head 82, a finish cutter head 83, a rough cut collar stop 84 and a finish cut collar stop 85. The superimposed collars and cutters are keyed to and clamped tightly on the top end 15a of the spindle 15 by a nut 86.

As illustrated in FIG. 6, the rotatable work table 28 of the automatic shaper 10a has a template 87 mounted thereon with a work piece 88 mounted on the top of the template with an interposed gasket 89 between the work 88 and the template providing a sealed space 90 to be vacuated for clamping the template and work piece on the work table 28 as more fully illustrated in the aforesaid Hitchcock et al U.S. Pat. No. 4,450,882.

The height of the spindle 15 is initially adjusted to position the collar 84 to ride on the periphery 87a of the template thereby aligning the work 88 with the rough cut cutter head 82. Upon completion of a cutting cycle, the spindle 15 is quickly raised and the work table advanced as shown in FIG. 7 to ride the finish collar stop 85 on the periphery 87a of the template and to align the work 88 with the finish cutter 83.

The quick shifting of the spindle or quill 15 from the rough cut position of FIG. 6 to the finish cut position of FIG. 7 is effected by the pneumatic jack 64 where compressed air under the piston 67 quickly raises it to raise the post or rod 51 thus raising the slide and the spindle to its new height.

As diagrammatically illustrated in FIG. 4, an air compressor 91 feeds a solenoid actuated reversing valve 92 which selectively and alternately supplies compressed air through a tube 93 to the top of the jack 64 and exhausts air under the piston through a tube 94 at the bottom of the jack and then reverses to supply air to the tube 94 and exhaust air from the tube 93 thereby alternately pressuring one side of the piston while releasing pressure from the opposite side. The solenoid core stops 74 will hold the stem 69 as the piston raises the screw rod 51 at selected levels. Thus, after the rough cut operation of FIG. 6, the bottom solenoid 75 can be energized to retract the core 74 permitting the nut 73 to be raised by the piston 67 against the core stop of the next solenoid. As explained above, the nut 73 is adjusted on the stem 69 to control the initial height of the spindle and then as the stops are selectively retracted the spindle can be raised to higher levels to carry the collar sets and cutters into operative alignment with the work. While three solenoids 75 have been illustrated it is obvious that only one solenoid need be used for a two position cutter head while more than one solenoid 75 increases the operating stages made available by this invention.

Rotation of the threaded rod or post 51, without rotating the piston rod 63 is accomplished through the relatively rotating coupling 60.

Figure 5:
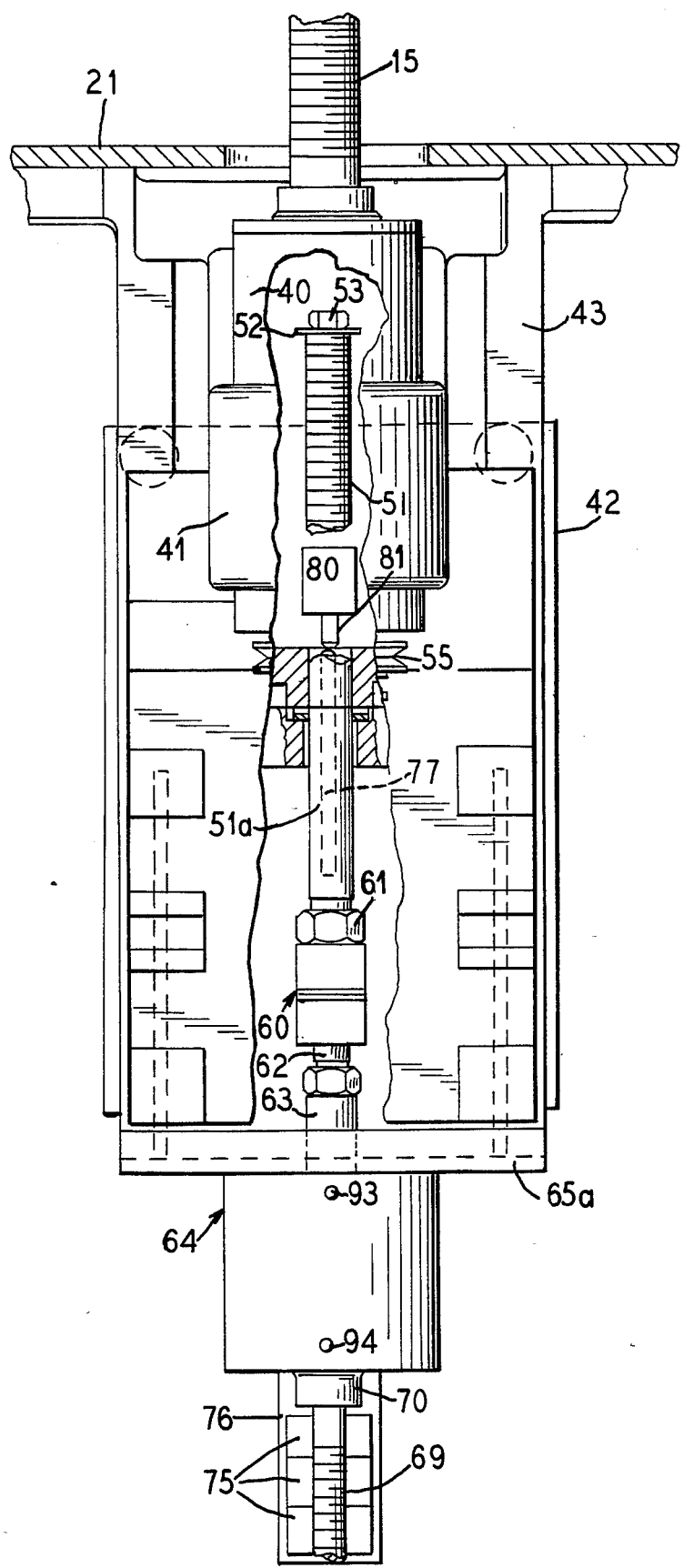
FIG. 5 is a fragmentary sectional view along the line V—V of FIG. 4.

The air valve 92 and the solenoids 75 may be manually controlled by push-buttons P conveniently mounted on the shapers 10 and 10a with suitable circuitry C illustrated in FIG. 5 or can be automatically actuated by a trip switch S engaged by a leg or pin L on the template 87 (FIG. 7) or on the turntable 28 so that after each complete revolution of the work, the switch S will be tripped to release the piston for raising the spindle to a higher level and at the completion of a multiple cutting cycle the switch can be tripped back to its starting position for the next work piece.

Figure 8:
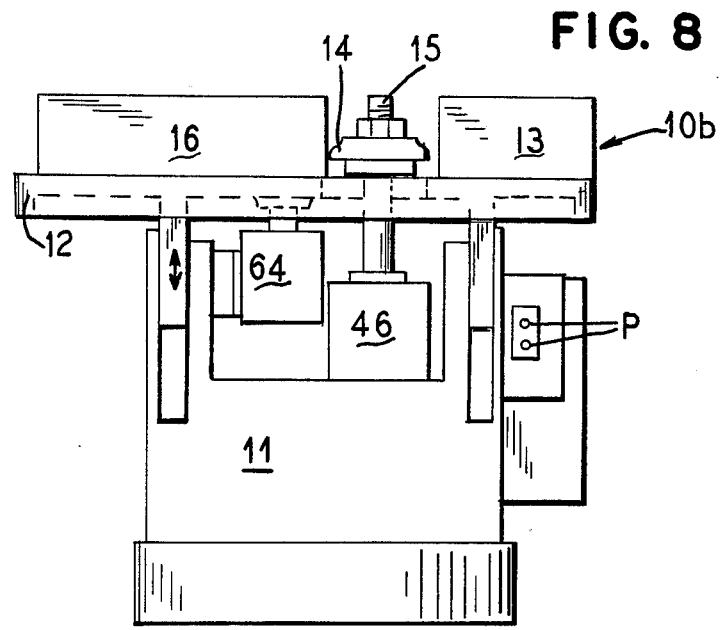
FIG. 8 is a front side elevational view with a portion broken away to show underlying parts, of a manual shaper similar to FIG. 1, but having the top work table raised and lowered relative to the spindle in an alternate embodiment providing the relationship of work and cutter head levels of FIGS. 6 and 7 by raising and lowering the work table instead of the spindle or quill.

As illustrated in FIG. 8, a modified manual spindle shaper 10b has the pneumatic jack 64 coupled to the work table 12 to raise and lower the work relatively to the spindle thereby obtaining the same type of alignments for sequential cutting operations as are obtained by raising and lowering the spindle in the above described shapers. In the manual shapers, the electrically driven air valve and solenoids are actuated from push-buttons convenient to the operator.

From the above description it will be clear to those skilled in this art that this invention provides spindle shapers, either of the manual or automatic type, which perform a plurality of successive operations on a work piece by shifting either the spindle or the work piece to successively align selected cutter heads with the work piece.

We claim as our invention:

1. A spindle shaper which comprises a work table, a spindle projecting beyond the table, a stack of cutter heads on the spindle, means for initially adjusting the relative levels of the table and spindle to align a cutter head on the spindle with work on the table, and means for quickly shifting the relative levels of the spindle and work table from the initial adjusted levels to selectively align another head with the work on the table.

2. The shaper of claim 1 wherein said means for quickly shifting raises and lowers the work table.

3. The shaper of claim 1 wherein said means for quickly shifting raises and lowers the spindle.

4. The shaper of claim 1 wherein the work table is a rotatably mounted turntable, and the spindle is quickly shifted by said additional means to seletively align a cutter head with work on the turntable.

5. The shaper of claim 4 including means for mounting a bearing stop on the spindle for each cutter head and means biasing the work table toward a selected bearing stop to control the feeding of a work piece on the table to a cutter on the spindle.

6. A spindle shaper adapted to sequentially form a plurality of cutting operations on a workpiece which comprises a work support table, a motor driven spindle projecting above the table, a stack of cutter heads removably mounted on the spindle, means for manually adjusting the height of the spindle relative to the table to initially align a first cutter head with a workpiece on the table, and additional means for quickly shifting the spindle from its initial adjusted position to align a second cutter head on the spindle with the workpiece on the table.

7. The spindle cutter of claim 6 wherein the means for quickly shifting the spindle is a fluid pressure actuated jack.

8. The spindle cutter of claim 7 wherein the jack has a piston rod rotatably coupled to a screw rod on which the spindle is suspended and a manually actuated gear controls the initial height of the screw rod.

9. The spindle shaper of claim 6 wherein the work support table is a turntable, a motor drives the turntable and means actuates the means for quick shifting upon completion of a predetermined cycle of rotation of the turntable.

10. The spindle cutter of claim 6 wherein the means for quickly shifting the spindle is a pneumatic jack, a reversing valve controls air flow to the jack and an electric circuit controls the valve.

11. A spindle shaper which comprises a work support, a vertical spindle projecting above said support, a plurality of cutter heads vertically stacked on said spindle in superimposed relation, a manually actuated worm and gear set raising and lowering said spindle to initially align a first cutter head with a workpiece on the table for a first cutting operation, and fluid pressure actuated means for quickly shifting the spindle from its initial manually adjusted position to align a second cutter head with the workpiece for performing a second cutting operation on the workpiece.

12. A single spindle multiple cutter shaper machine which comprises an upright base frame having a table top, a casing suspended from said table top, a vertical slide mounted on said casing, worm and gear means in said casing raising and lowering said slide, a handwheel projecting beyond the base frame for actuating said worm and gear means, an upright housing carried by said slide, an upright spindle rotatably mounted in said housing projecting above said table top, a stack of pulleys on said spindle under said housing, an upright electric motor mounted on said slide having a driven shaft, a stack of pulleys on said shaft, a belt connecting selected pulleys on the motor drive shaft and on the spindle to drive the spindle from the motor at a speed determined by the selected pulley combination, a stack of cutter heads removably mounted on the spindle above the table top and fluid pressure actuated means rapidly shifting said spindle from an initial adjusted position to a second position for a second cutting operation.

* * * * *